G. S. TURNER.
SEAL.
APPLICATION FILED SEPT. 20, 1910.
989,450.
Patented Apr. 11, 1911.
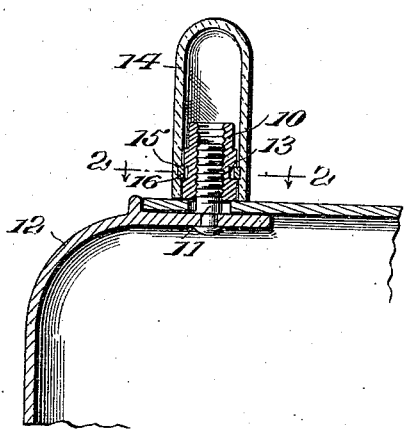
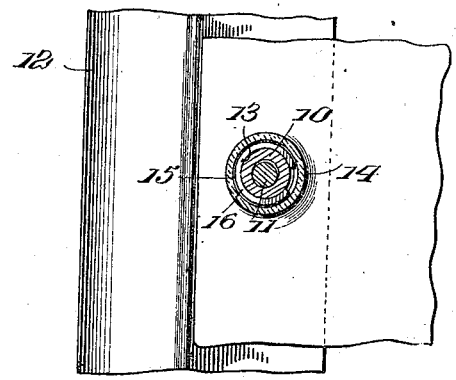
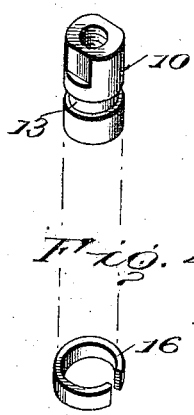
Witnesses
W. H. Woodson
Juana M. Fallin
G. S. Turner.
By H. H. Lacy, Attorneys.

UNITED STATES PATENT OFFICE.

GUY S. TURNER, OF MEMPHIS, TENNESSEE.

SEAL.

989,450.

Specification of Letters Patent. Patented Apr. 11, 1911.

Application filed September 20, 1910. Serial No. 582,913.

*To all whom it may concern:*

Be it known that I, GUY S. TURNER, citizen of the United States, residing at Memphis, in the county of Shelby and State of Tennessee, have invented certain new and useful Improvements in Seals, of which the following is a specification.

This invention relates to seals adapted for use upon gas or electric meters, for car seals and for like purposes, and has for one of its objects to simplify and improve the construction and increase the efficiency and utility of devices of this character.

With this and other objects in view, the invention consists in certain novel features of construction as hereafter shown and described and then specifically pointed out in the claim.

The improved device may be applied to any of the various structures which require a "seal" to protect them from surreptitious access, but is more particularly adapted for use upon electric or gas meters, and for the purpose of illustration is shown applied to a conventional electric meter, and in the drawings thus employed, Figure 1 is a view of a portion of an electric meter with the improved "seal" applied and partly in section; Fig. 2 is a section on the line 2—2 of Fig. 1; Fig. 3 is a perspective view of the "nut" portion of the improved device detached; Fig. 4 is a perspective view of the resilient member of the improved device detached.

Corresponding and like parts are referred to in the following description and indicated in all the views of the drawings by the same reference characters.

The improved device comprises in general an infrangible member in the form of a nut having an external recess, a hollow frangible member engaging over the infrangible member and provided with an internal recess, and an expansive member between said frangible and infrangible members and engaging in said recesses.

The nut employed is represented at 10 and engaging over the fastening bolt 11 of a conventional electric meter represented at 12, the nut being provided with an external recess preferably in the form of an annular groove 13. Fitting relatively close over the nut is a hollow frangible member 14 provided with an internal recess preferably in the form of an annular recess 15 corresponding to and registering with the recess 13 of the nut. Located between nut 10 and the frangible member 14 is an expansible member 16 preferably in ring form, and engaging by its expansive force in both of the recesses 13 and 15 thus locking the parts 10—14 inseparably together. By this simple arrangement, after the nut 10 has been applied, the expansible member 16 is located in the recess 13 and the frangible member forced over the expansible member until the two recesses register when the members 16 will automatically expand and lock the parts together and effectually "seal" them, as the member 14 cannot be removed and the nut released without breaking the frangible member.

The improved device is simple in construction, can be inexpensively manufactured and applied, and operates effectually for the purposes described.

Having thus described the invention, what is claimed as new is:—

An inner member having interior threads and an external recess, an outer frangible shell having an internal recess, an expansible member engaging in said recesses, and a screw engaging in said threaded member.

In testimony whereof, I affix my signature in presence of two witnesses.

GUY S. TURNER. [L. S.]

Witnesses:
CARL K. CHAPIN,
H. SCHULE.

Copies of this patent may be obtained for five cents each, by addressing the "Commissioner of Patents, Washington, D. C."